United States Patent [19]

Mohler

[11] 3,966,309

[45] June 29, 1976

[54] ADJUSTABLE MOUNTING STRUCTURE FOR OPTICAL DEVICE

[75] Inventor: Galen E. Mohler, Mountain View, Calif.

[73] Assignee: Lexel Corporation, Palo Alto, Calif.

[22] Filed: Nov. 25, 1974

[21] Appl. No.: 526,506

Related U.S. Application Data

[62] Division of Ser. No. 392,614, Aug. 20, 1973, Pat. No. 3,864,029.

[52] U.S. Cl. .............................. 350/310; 350/288
[51] Int. Cl.² .......................................... G02B 5/08
[58] Field of Search ............ 350/310, 288, 255, 10; 267/160, 164, 165; 33/246, 298, 286; 331/94.5 C

[56] References Cited
UNITED STATES PATENTS

| | | | |
|---|---|---|---|
| 2,893,717 | 7/1959 | Simmons | 350/255 |
| 3,204,471 | 9/1965 | Rempel | 331/94.5 |
| 3,226,830 | 1/1966 | Everitt | 33/286 |
| 3,359,812 | 12/1967 | Everitt | 350/310 |
| 3,683,297 | 8/1972 | Hobart et al. | 331/94.5 |
| 3,783,407 | 1/1974 | Mefferd et al. | 331/94.5 C |
| 3,883,820 | 5/1975 | Burns et al. | 350/288 |

Primary Examiner—John K. Corbin
Assistant Examiner—Jon W. Henry
Attorney, Agent, or Firm—C. Michael Zimmerman

[57] ABSTRACT

A laser is described which includes optical mirror mounting structure providing stable support for the optical mirrors and yet enabling precise and reproducible angular reorientation of the same with respect to the optical axis of the lasing tube. The mounting structure for each of such mirrors includes a pair of generally parallel, rectangular plates, one of which is rigidly associated with the lasing tube and the other one of which is a mount for the mirror. Such plates are adjustably connected together adjacent three corresponding corners to provide orthogonal adjustment of one with respect to the other. Each connection at a corner includes a tuning bolt which is threadably received within one of the plates and bears against the other. It also includes a leaf spring rigidly secured between such plates to provide a compressive force on its associated tuning bolt. Each of such leaf springs is formed by a pair of leaf portions respectively secured to an associated one of the plates and extending generally transversely with respect to the direction of movement of the tuning bolt, which portions defines an expandable joint in the leaf spring enabling the same to lengthen to compensate for changes in the distance between the plates caused by the tuning bolt. A tubular cover is provided at each end of the lasing tube extending therebetween and the optical mirror associated with such end. Each of such tubular covers includes a ball joint permitting angular orientation of the mirror mounting structure with respect to the envelope and, hence, the optical axis.

10 Claims, 8 Drawing Figures

U.S. Patent   June 29, 1976   3,966,309
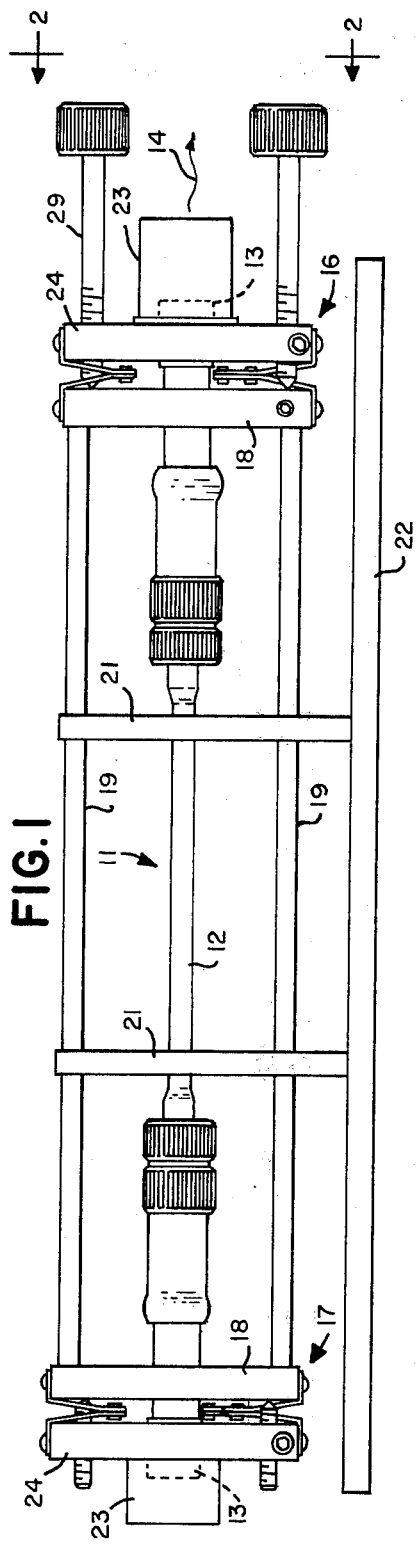
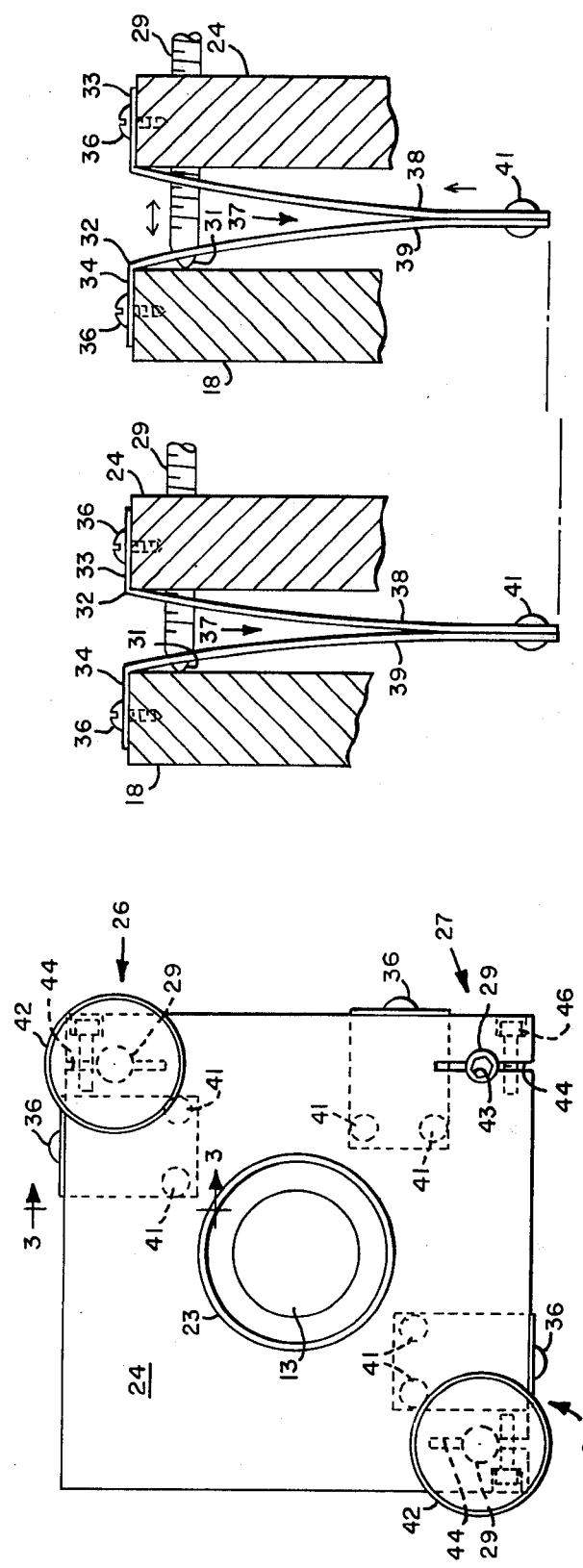

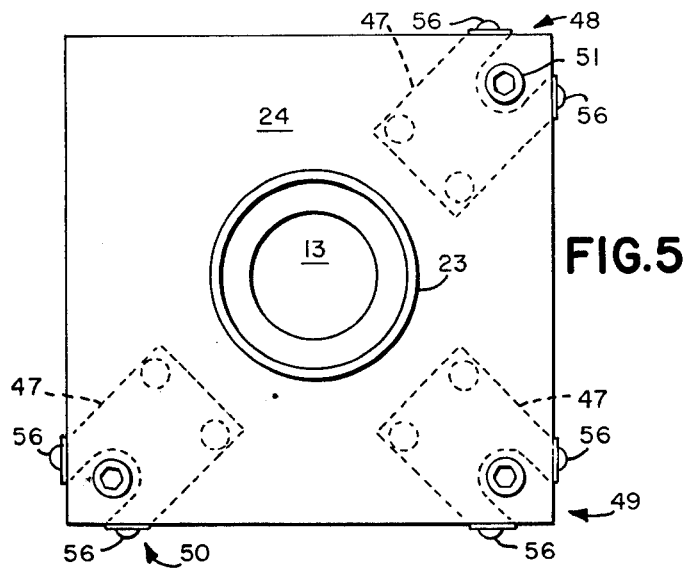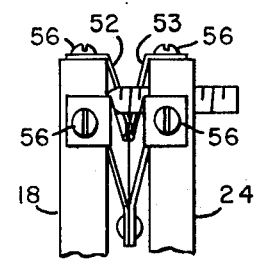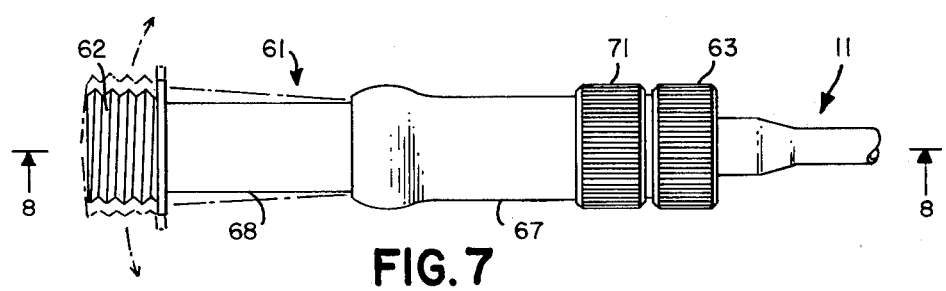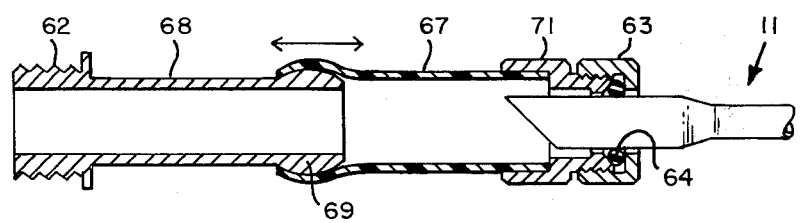

ADJUSTABLE MOUNTING STRUCTURE FOR OPTICAL DEVICE

This is a division, of application Ser. No. 392,614, filed Aug. 20, 1973 now Patent No. 3,864,029.

BACKGROUND OF THE INVENTION

The present invention relates to mounting structure for optical instruments and, more particularly, to such an instrument which enables the position of an optical device with respect to an optical axis to be accurately adjusted. The invention more specifically relates to a laser which includes a simple mounting structure providing precise and stable angular reorientation of the laser end mirrors with respect to the optical axis of the lasing tube.

It is important in most optical instrumentation that optical devices of one sort or another, such as lenses, mirrors, prisms, etc., be precisely positionable with respect to an optical axis. For example, proper operation of a laser depends on precise and stable angular alignment of the optical reflectors (mirrors) at the opposite ends of the lasing medium envelope. Such alignment is necessary to assure that the requisite number of passes of the optical radiation through the lasing medium are effected for laser oscillation. Moreover, it is desirable that such alignment be precisely and reproducibly adjustable to enable differing wavelength outputs and optimization of the output power.

Much effort and time has been spent by those in the art in attempts to arrive at a satisfactory mirror mounting structure for lasers providing the desired stable positioning while allowing precise angular reorientation. It is now generally accepted that such a mounting mechanism preferably provides independent rotational movement of the mirror about at least two perpendicular axes to assure that any desired angular setting can be achieved. However, the apparatuses which have been designed in the past to provide such adjustments have not been entirely satisfactory. They are, in general, relatively complicated and do not provide the precise and stable positioning desired. For example, some of such devices have included coil springs extending between the mirror mount and a reference structure. Such springs generally interfere with the stableness of any given mirror setting and the sensitivity with which changes can be made. Prior mounting structures often have also included tieing structure of one sort or another between the mirror mount and the reference structure to maintain mirror settings rigid, which tieing structure has interfered with truly independent movement about the perpendicular axes.

SUMMARY OF THE INVENTION

The present invention is a mounting structure for an optical instrument such as a laser which provides a highly stable support for an optical device and adjustment of the positioning of such device with both a high degree of accuracy and sensitivity. The structure of the invention satisfies such functions while yet being simple and not requiring the use of components such as coil springs and tieing structures, which interfere with optimum operation thereof. In its basic aspects, the mounting structure includes, as is usual for such a structure, a reference member positioned at a predetermined location relative to an optical axis of the instrument, and a mount for the optical device whose position is to be adjusted with respect to such optical axis. The connecting means between the mount and the reference member providing the adjustment includes a separator, such as a tuning bolt, which extends between the reference member and the mount for maintaining the same spaced apart. The length of such separator along a path extending directly between the reference member and the mount is selectively variable to enable the distance between such reference member and the mount at the location of such reference member to be changed.

The connecting means further includes a leaf spring which has its opposite ends secured to the reference member and the mount and is in tension therebetween to resiliently urge the same toward one another by maintaining a compressive force on the separator. As a particularly salient feature of the instant invention, the leaf spring includes an expansion and contraction joint between its ends which enables the same to or shorten to compensate for changes in the distance between the reference member and the mount. Most desirably, the joint of the leaf spring includes a reentrant portion which extends transversely with respect to the path along which the length of the separator is selectively variable. Joint expansion and contraction is thus obtained by changes in the included angle of the reentrant portion. The orientation of the reentrant portion transversely with respect to the separator path reduces or, as in the case with the preferred embodiment, eliminates any adverse affect on the rigidity of the connection between the mount and reference member caused by the expandable joint of the leaf spring.

The mounting structure is particularly designed to be included in a laser as an adjustable mounting structure for an optical reflector positioned across the optical axis along which energy emanating from the lasable medium passes in order to intercept such energy for reflection. When included as part of a laser, such mounting structure most desirably includes three orthogonally located separators and associated leaf springs which includes an expansion and contraction joint in order to enable independent orthogonal rotation as desired.

As another salient feature of the instant invention, it includes a tubular cover which extends between the laser envelope enclosing lasing medium and such mounting structure, which cover allows the mounting structure to be used to angularly reorient the reflector while maintaining it isolated from the ambient atmosphere exteriorly of the laser envelope. Such cover has its opposite ends respectively secured to the lasing medium envelope and such mounting structure, and includes a tubular ball joint along its length which responds to such angular reorientation. Most desirably, such tubular cover is provided by a pair of coaxial tubes which join one another with the ends of one of such tubes at such joint being received within the end of the other tube thereat. The ball joint then includes a rigid ball surface on one of the joining ends, mating with a deformable elastic portion on the other of the joining ends. This arrangement will provide the desired ball joint connection while maintaining integrity of a seal thereat. Moreover, it will permit axial movement of the tubes relative to one another without the integrity of such seal being broken.

The invention includes other features and advantages which will be described or will become apparent from the following more detailed description of the preferred embodiments.

BRIEF DESCRIPTION OF THE DRAWINGS

With reference to the accompanying two sheets of drawing:

FIG. 1 is a generally schematic, elevation view of a laser incorporating a preferred embodiment of the present invention;

FIG. 2 is an enlarged, elevation view of the laser mirror mounting structure viewed from the plane indicated by the lines 2—2 in FIG. 1;

FIG. 3 is a further enlarged, partial sectional view taken on the plane indicated by the lines 3—3 in FIG. 2, and illustrating a preferred embodiment of the connecting means of the invention;

FIG. 4 is a view similar to FIG. 3 showing the connecting means at a different position of adjustment;

FIG. 5 is an end elevation view similar to FIG. 2 of a laser mirror mounting structure incorporating another preferred embodiment of the invention;

FIG. 6 is a partial end view of the mounting structure of FIG. 5 providing details of the connecting means thereof;

FIG. 7 is an enlarged elevation view of the tubular cover component of the invention; and FIG. 8 is a sectional view of the tubular cover taken on a plane indicated by the lines 8—8 in FIG. 7.

DETAILED DESCRIPTION OF THE PREFERRED EMBODIMENT

With reference to the accompanying drawings, FIG. 1 is an overall view of a laser incorporating the present invention. Such laser includes an elongated envelope or tube 11 which encloses a lasable medium, i.e., quantum resonant particles, such as an ionized noble gas, e.g., argon, at a pressure of about 1 torr. As is conventional, means (not shown), such as an electrode and a power source, are provided for initiating an electrical discharge in the lasable medium. The result will be that optical radiation will be propagated along the axis 12 of the tube 11, which axis is referred to herein as the optical axis. Such radiation passes through windows at the opposite ends of the tube 11 and is reflected by optical reflectors or mirrors 13 at such ends back and forth through the tube a sufficient number of times to sustain laser oscillation. Transmission of optical radiation through one or both of the reflectors, as represented at 14, constitutes the coherent light radiation output of the laser.

As mentioned previously, it is necessary to provide a mounting structure for each of the mirrors which will support the same quite stably at any given position and yet allow highly sensitive and reproducible changes to be made in the angular orientation of such mirrors with respect to the optical axis 12. Mounting structures, referred to generally by the reference numerals 16, and 17, are respectively included at the opposite ends of the laser for such purpose. Each of such structures includes a reference member in the form of a rectangular plate 18 which is positioned at a predetermined location relative to the optical axis 12. In this connection, the opposite plates 18 are joined via three rods 19 which are secured therebetween adjacent corresponding corners of such plates. Rods 19 are, in turn, supported via spaced apart vertical uprights 21 which project upwardly from a base 22. The uprights 21 also act as supports for laser tube 11. It is the supporting structure made up of the rods 19, the uprights 21, and the base 22 which support the reference plates 18 at predetermined locations with respect to the tube 11, and, hence, the optical axis 12.

Each of the mounting structures 16 and 17 further includes a mount for its associated optical reflector 13. That is, as illustrated, each of the optical reflectors is mounted at the front wall of a cylindrical extension 23 projecting coaxially with the optical axis 12 from a rectangular mount plate 24.

Each of the plates 24 is positioned parallel and adjacent to its associated reference plate 18, and means are provided for connecting each of the mounts to its associated reference member for adjustment of the position of such mount with respect to such reference member and, hence, with respect to the optical axis 12. Such connecting means includes three separate connections 26, 27 and 28 which are spaced from one another and from the optical axis 12. More particularly, as is best seen from FIG. 2, the three connections provide connection between the associated reference and mounting plates at three corresponding corners thereof. Each of the connecting means enables adjustment at its location of the distance between the reference and mounting plates. Furthermore, the locations of such connecting means are so related that straight lines drawn respectively from the connections 26 and 28 to the connection 27 will intersect one another generally at a right angle. Thus, such connections cooperate to provide independent rotational movement of the mounting plate and, hence, the optical reflector about perpendicular axes to enable desired orthogonal adjustments.

Each of the connecting means includes two components, a separator which extends between the reference and mount plates to maintain the same spaced apart at the location of the respective connecting means, and a leaf spring which is in tension between the reference and mount plates to resiliently urge the plates toward one another by maintaining a compressive force on the separator. The position adjustment at each of the connections is obtained by varying the length of the separator along a path which extends directly between the reference and mount plates. The connecting means 26 through 28 are generally the same, and their details will be described with reference to connecting means 26. More particularly, as shown in FIGS. 2 and 3, the separator is in the form of a tuning bolt 29 which extends threadably through the mount plate 24 and terminates in a bearing end 31 which abuts or bears against the facing surface of the reference plate 18. The leaf spring of each of the connections is generally referred to by the reference numeral 32 and has its opposite ends respectively secured to the reference plate 18 and mount plate 24. That is, the ends 33 and 34 of the spring are positioned respectively against the upper end surfaces of the mount and reference plates and are rigidly secured thereto by bolts 36.

The utilization of a leaf spring to provide the compressive force on the separator tuning bolts has the advantage of providing such compressive force while at the same time preventing parallel displacement or parallel rotation of the plates with respect to one another. As a particularly salient feature of the instant invention, the spring 32 includes an expansion and contraction joint between its ends which enables the same to lengthen and shorten to compensate for any change in the distance between the reference and mount plates without affecting the rigidity with which such spring prevents parallel displacement between such plates. More particularly, the spring 32 includes a reentrant portion 37 extending transversely of the direction along which the tuning bolt changes the separation between such plates. This transverse relationship of the reentrant portion to the direction of movement of the tuning bolt provides the desired expandable joint without the necessity of there being any parallel displacement or rotation between the plates when they are separated. As illustrated, the leaf spring is formed by a pair of leaf portions 38 and 39 which respectively provide the ends 33 and 34 which are secured to the mounting and reference plates. The remainder of each of the leaf portions, i.e., that portion of each which is positioned between the mount and reference plates, extends generally transversely of the bolt 29. Such leaf portions terminate in second ends which are rigidly secured together by rivets 41. Each of the leaf spring portions 38 and 39 are made of a spring steel, and the rivets 41 tend to maintain the same "back-to-back", i.e., abutting one another for the full length which extends between the mounting plates. However, because of the securance of the upper ends of each to the respective plates 18 and 24, such portions are forced apart. It is the resistance to such separation by the leaf spring portions which places the leaf spring in tension between the reference and mount plates and thereby provides the compressive force on that portion of the tuning bolt extending between the plates.

FIGS. 3 and 4 illustrate the reference and mount plates with two different separation distances. The reaction of the spring to such differing separations is readily apparent from a comparison of such figures. That is, the greater length of spring which must be provided in the direction of the separation for a greater separation distance as illustrated in FIG. 4, is provided by a corresponding reduction in the length of such spring transversely to such direction. In other words, the joined ends of the leaf portions move upward as viewed in the drawing toward the other ends of such leaf portions when the plates are separated further apart. This transverse compensation for the expansion enables such expansion to take place without there being any parallel displacement of the plates because of the securance of the leaf spring therebetween.

With reference again to FIGS. 1 and 2, it will be recognized that rotation of tuning bolt 29 of the connection 26 will result in rotation of the mount plate 24 relative to the reference plate 18 about an axis which passes between the tuning bolts of the connections 27 and 28. By the same token, rotation of the tuning bolt of the connecting means 28 will result in rotation of the mount plate about an axis which passes between the tuning bolts of connections 26 and 27. Thus, the desired orthogonal rotations can be effected merely by rotating the tuning bolts of the connections 26 and 28 to vary the distance between such plates at their respective locations. To facilitate manual rotation of the tuning bolts of such connections 26 and 28, each is provided with a knurled tuning knob 42.

Adjustment of the distance between the two plates at the connection 27 by rotation of the tuning bolt thereat will reorient the plane defined by the two axes about which the connecting means 26 and 28 provide rotation. Since such an adjustment generally is made only infrequently, the tuning bolt of such connection is provided with a hexagonal socket 43 for engagement by a suitable tool to effect such rotation, rather than a tuning knob.

It will be appreciated that in order to obtain reproducibility and sensitivity, the connections between the mounting and reference plates must be maintained precisely within close tolerances at all times. That is, play in the connections cannot be tolerated. The design of the leaf spring assures that it will not contribute to any play, assuming, of course, that its ends are rigidly secured to the respective plates. There is, however, the possibility of some play in any threaded engagement of parts, such as between the engaging threads of the tuning bolts and the bores in the mounting plate through which such bolts extend. To eliminate such play, means are provided for adjusting the lateral compressive pressure to which each of the bolts is subjected in the bore by the mounting plate. That is, as can best be seen from FIG. 2, each of the bores through which one of the bolts extends is provided with a slot which projects from the edge of the mounting plate transversely through and in communication with such bore. An adjustment screw 46 connects opposite sides of each of the slots for drawing the same toward one another. It will be appreciated that rotation of the adjustment screw will thus effect a change in the dimension across the bore transversely of the slot. Thus, such screw can be rotated to increase the pressure provided by the bore on the bolt which extends therethrough. Such pressure is thus adjustable to compensate for any free play between the threads of the bolt and those of the bore.

It will be noted from FIG. 2 that the leaf spring of each of the connections is positioned closely adjacent the point at which the tuning bolt of the connection passes between the reference and mount plates. This close positioning will assure that the compressive force provided by the spring will apply only a minimum of torque at the lcoation at which the separator is positioned. It is recognized, however, that in some optical uses of the mounting structure of the invention, even such low torque can have an effect on the accuracy and sensitivity of adjustment. FIGS. 5 and 6 illustrate an alternate embodiment of the mounting structure which eliminates the effect of such torque. With reference to such figures, it will be seen that the leaf spring 47 of each of the connections 48, 49 and 50 of such mounting structure is positioned on opposite sides of the path of its associated tuning bolt 51 to balance any torque applied to such tuning bolt by the spring compressive force. That is, each of the leaf portions 52 and 53 of each spring 47 is provided with axially an located slot 54 through which its associated tuning bolt 51 extends. The resulting pair of separated ears on the spring are rigidly connected via bolts 56 to the plates to provide the securance of the opposite ends of the spring therebetween. This construction results in any compressive force provided by the spring on one side of the tuning bolt 51 to be balanced by an equal and opposite torque due to such compressive force on the opposite side of the bolt.

The embodiment of FIGS. 5 and 6 is in all other respects substantially the same as the embodiment of FIGS. 1 and 2. For this reason, like parts are referred to by like reference numerals.

It is most desirable that the path of optical radiation in the laser, as well as all optical components thereof, be maintained free of contamination. The lasing tube 11 is sealed, with the result that contamination interiorly thereof is no problem, assuming that no contamination is present when the tube atmosphere is initially placed therein. Protection against contamination and dirt should also be provided for the optical components of the laser exteriorly of the tube and the path of radiation along the optical axis exteriorly of such tube. The means for providing such protection, however, must be means which does not hinder accurate adjustment of the angular orientation of the optical reflectors with respect to the lasing tube. As another salient feature of the instant invention, it includes means which provides protection against contamination without in any way affecting such adjustment. More particularly, with reference to FIGS. 1, 7 and 8, a tubular cover is provided at opposite ends of the envelope 11 enclosing the path for optical energy along the optical axis between such envelope and each of the optical reflectors 13. To this end, each tubular envelope 61 includes a threaded end 62 which is threadably received within a bore in the mount plate with which it is associated. Such end will therefore provide communication between the cover and the tubular extension 23 which otherwise encloses the optical reflector 13 mounting on such mounting plate. The other end of each tubular cover includes a collar 63 which, as is best illustrated in FIGS. 7 and 8, circumscribes the end of the lasing tube with which it is associated and is sealed thereon by an O-ring seal 64. Such arrangement will result in the transmission window 66 at the end of the envelope being contained within the tubular structure.

As a particularly salient feature of the tubular cover, it includes a tubular ball joint between its ends which allows angular orientation of the mount plate with respect to the envelope and, hence, with respect to the optical axis. More particularly, the tubular cover 61 is provided by a pair of coaxial tubes 67 and 68 joining one another at adjacent ends and having their opposite ends defining the tubular cover ends 62 and 63 which are respectively secured to the mount plate and to the envelope 11 about the window 64. The end of the tube 68 is received within the joining end of the tube 67. Such tube 68 is made of a rigid material, such as a metal, and includes a circumferential ball surface 69 projecting peripherally therefrom at said end. Such ball surface thereby provides a rigid ball for the ball joint. The tube 67, on the other hand, is of a deformable elastic material, such as of Teflon, with a radius less than the radius of the peripheral ball surface 69. The result is that the end of such tube which surrounds the ball will be deformed thereby and, because of its elasticity, grip the same to provide a seal.

It will be recognized that the tubular ball joint provided by the mating ends of the tubes 67 and 68 will enable angular movement of one with respect to the other at such joint as illustrated in FIG. 7. Just as importantly, the construction of such ball joint enables the tubes to move axially with respect to one another. That is, because the ball cavity is not rigid, but rather is provided by the deformable elastic tube 67, axial movement of the tubes at such ball joint is permitted. Thus, the mounting structure to which the tube 68 is secured is completely free for movement, including movement axially along the optical axis. Adjustment of the optical reflector is therefore not hindered by the tubular cover.

Most desirably, the tube 67 is selectively releasable from the lasable medium envelope 11. To this end, the end of tube 67 adjacent the lasing medium envelope includes an intermediate collar 71 which is threadably received within the collar 63. As can be seen from FIG. 8, rotation of such collar 71 with respect to the collar 63 will result in release of the tube from around the envelope 11. Moreover, because the tube 67 is elastic, such tube is retractable from the window 66 by being telescopically slid over the tube 68. This enables access to the window for the purpose of cleaning and the like.

While the invention has been described in connection with preferred embodiments thereof, it will be appreciated by those skilled in the art that various changes and modifications can be made without departing from its spirit. It is therefore intended that the coverage afforded applicant be limited only by the claims and their equivalents.

I claim:

1. A mounting structure enabling adjustment of the position of an optical device relative to an optical axis comprising a reference member positioned at a predetermined location relative to said optical axis, a mount for said optical device, and means connecting said mount to said reference member for adjustment of the position of said mount with respect to said reference member, said connecting means including:
   A. a first connection between said reference member and said mount at a first location, said first connection having:
      1. a separator which extends between said reference member and said mount at said first location for maintaining the same spaced apart thereat, the length of said separator along a path extending directly between said reference member and said mount at said first location being selectively variable; and
      2. a leaf spring having opposite ends respectively secured independently of said separator to said reference member and said mount and being in tension therebetween to resiliently urge said reference member and said mount toward one another at said first location by maintaining a compressive force on said separator, said leaf spring being characterized by including an expansion and contraction joint under tension between said opposite ends enabling said spring to lengthen and shorten to compensate for changes in the distance between said reference member and said mount while maintaining a compressive force on said separator;
   B. said expansion and contraction joint being free of any other connection between said reference member and said mount for changes in the distance between said reference member and said mount at said first location independently of any other connection between said reference member and said mount.

2. The mounting structure of claim 1 wherein said expansion and contraction joint of said leaf spring includes a reentrant portion which extends transversely with respect to the path along which the length of said separator is selectively variable.

3. The mounting structure of claim 2 wherein said reentrant portion of said leaf spring is formed by a pair of leaf portions, each of which has a first end respectively secured to an associated one of said reference members and said mount, and the remainder of which extends from said first end generally transversely with respect to the path along which the length of said separator is selectively variable to a second end which is rigidly secured to the second end of the other one of said leaf portions.

4. The mounting structure of claim 1 wherein said leaf spring is secured between said reference member and said mount adjacent said path along which the length of said separator is selectively variable to provide said compressive force on said separator with a minimum of torque.

5. The mounting structure of claim 4 wherein said leaf spring is positioned on opposite sides of said path to balance torque applied to said separator by said spring compressive force.

6. The mounting structure of claim 1 wherein it is the angular orientation of said optical device with respect to said optical axis which is to be accurately adjusted by said mounting structure, said separator and leaf spring of said connecting means is spaced from said optical axis, and said connecting means includes a second connection between said mount and reference member at a second location spaced from the location of said first connection, whereby selective variation of the length of said separator along said path changes said angular orientation whenever said second connection maintains the distance between said reference member and said mount constant at its location.

7. The mounting structure of claim 6 wherein said second connection includes a second separator extending between said reference member and said mount for maintaining the same spaced apart at its location, the length of said separator of said second connection along a path extending directly between said reference member and said mount being selectively variable, and a second leaf spring at said second location having opposite ends respectively secured independently of said second separator to said reference member and said mount and being in tension therebetween to resiliently urge said reference member and said mount toward one another at said second location by maintaining a compressive force on said second separator, said second leaf spring including an expansion and contraction joint under tension between said opposite ends enabling said second leaf spring to lengthen and shorten to compensate for changes in the location between said reference member and said mount at the location of said second connection while maintaining a compressive force on said second separator, said expansion and contraction joint of said second leaf spring being free of said first connection for changes in the distance between said reference member and said mount at the location of said second connection independently of distance changes therebetween at said first location.

8. The mounting structure of claim 7 wherein said connecting means includes a third connection between said reference member and said mount spaced from the locations of said first and second connections and positioned at a third location at which straight lines drawn thereto from each of the locations of said first and second connections will intersect one another generally at a right angle.

9. The mounting structure of claim 8 wherein said third connection includes a third separator extending between said reference member and said mount at said third location for maintaining the same spaced apart thereat, the length of said third separator along a path extending directly between said reference member and said mount at said third location being selectively variable, and a third leaf spring at said third location having opposite ends respectively secured independently of said third separator to said reference member and said mount and being in tension therebetween to resiliently urge said reference member and said mount toward one another at said third location by maintaining a compressive force on said third separator, said third leaf spring including an expansion and contraction joint under tension between said opposite ends enabling said third leaf spring to lengthen and shorten to compensate for changes in the distance between said reference member and said mount at said third location while maintaining a compressive force on said third separator, said expansion and contraction joint of said third leaf spring being free of both said first and second connections for changes in the distance between said reference member and said mount at the location of said third connection independently of distance changes therebetween at the locations of said first and second locations, whereby selective variation of the length of said separator of said third connection along said path changes the angular orientation between said reference member and said mount whenever both said first and second connections maintain the distance therebetween constant at their respective locations.

10. The mounting structure of claim 8 wherein said separator of each of said first and second connections is secured to one of said reference member and said mount for adjustment of its length and bears against the other one of said reference member and mount for maintaining the same apart.

* * * * *